(12) United States Patent
Shirasaka (10) Patent No.: US 9,785,869 B2
(45) Date of Patent: Oct. 10, 2017

(54) IMAGE FORMING SYSTEM AND APPARATUS FOR PRINTING IMAGE BLOCK SEQUENCE USING CONTINUOUS PRINTING SHEET

(71) Applicant: Oki Data Corporation, Tokyo (JP)

(72) Inventor: Mitsuyoshi Shirasaka, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/887,133

(22) Filed: Oct. 19, 2015

(65) Prior Publication Data

US 2016/0247047 A1    Aug. 25, 2016

(30) Foreign Application Priority Data

Feb. 19, 2015 (JP) ................. 2015-030609

(51) Int. Cl.
| | |
|---|---|
| *G06K 15/02* | (2006.01) |
| *G06K 15/00* | (2006.01) |
| *B41J 3/407* | (2006.01) |
| *H04N 1/00* | (2006.01) |
| *G03G 15/00* | (2006.01) |
| *G06F 3/12* | (2006.01) |

(52) U.S. Cl.
CPC .......... *G06K 15/022* (2013.01); *B41J 3/4075* (2013.01); *G03G 15/6523* (2013.01); *G06F 3/12* (2013.01); *G06K 15/1806* (2013.01); *G06K 15/1807* (2013.01); *G06K 15/404* (2013.01); *H04N 1/00676* (2013.01)

(58) Field of Classification Search
CPC ...... B41J 3/4075; B41J 11/403; B41J 11/663; B41J 11/00; B41J 11/66; B41J 15/00; B41J 11/703; G06K 15/022; G06K 15/024; G03G 15/6523; H04N 1/00676
See application file for complete search history.

(56) References Cited

U.S. PATENT DOCUMENTS

| | | | |
|---|---|---|---|
| 2003/0107640 A1* | 6/2003 | Chang | B41J 11/008 347/107 |
| 2003/0126962 A1* | 7/2003 | Bland | B41J 11/46 83/13 |

(Continued)

FOREIGN PATENT DOCUMENTS

JP    2010-097008 A    4/2010

*Primary Examiner* — Nicholas Pachol
(74) *Attorney, Agent, or Firm* — Rabin & Berdo, P.C.

(57) ABSTRACT

An image forming system for printing a sequence of image blocks on a continuous printing sheet based on image data, includes an information processing apparatus and an image forming apparatus. A printing setting unit included by the information processing apparatus designates first information and second information. The first information indicates whether a printing order of the image blocks is to be a normal order or a reverse order. The second information indicates how many image blocks of the sequence are to be printed on each of a plurality of segments of the printing sheet. The image forming apparatus includes a cutting unit and a control unit. The cutting unit cuts the printing sheet. The control unit controls the cutting unit so as to separate the segments of the printing sheet. The control unit determines cutting positions on the printing sheet based on the first information and the second information.

7 Claims, 9 Drawing Sheets

(56) References Cited

U.S. PATENT DOCUMENTS

| | | | | |
|---|---|---|---|---|
| 2008/0031672 | A1* | 2/2008 | Yamaguchi | B41J 3/4075 400/76 |
| 2010/0098445 | A1* | 4/2010 | Negishi | G03G 15/50 399/43 |
| 2011/0211009 | A1* | 9/2011 | Fujinaga | B41J 29/393 347/16 |
| 2011/0211892 | A1* | 9/2011 | Yasuzaki | B41J 3/60 400/76 |
| 2012/0039651 | A1* | 2/2012 | Yamaguchi | B41J 3/4075 400/613 |
| 2012/0199022 | A1* | 8/2012 | Shishido | B41J 11/70 101/45 |
| 2012/0200629 | A1* | 8/2012 | Minamisawa | B41J 11/663 347/16 |
| 2012/0236341 | A1* | 9/2012 | Negishi | G06K 15/024 358/1.12 |
| 2014/0036017 | A1* | 2/2014 | Naruse | B41J 11/663 347/104 |
| 2014/0362157 | A1* | 12/2014 | Tomomatsu | B41J 11/663 347/218 |
| 2016/0196093 | A1* | 7/2016 | Bandyopadhyay | G06F 3/1215 358/1.15 |

* cited by examiner

IMAGE FORMING SYSTEM AND APPARATUS FOR PRINTING IMAGE BLOCK SEQUENCE USING CONTINUOUS PRINTING SHEET

CROSS REFERENCE TO RELATED APPLICATIONS

This application claims priority based on 35 USC 119 from prior Japanese Patent Application No. 2015-030609 filed on Feb. 19, 2015, the entire contents which are incorporated herein by reference.

BACKGROUND OF THE INVENTION

1. Field of the Invention

This application is directed to an image forming system, an image forming apparatus, and an information processing apparatus.

2. Description of Related Art

A conventional image forming apparatus forms image blocks on a sheet based on image data. The conventional image forming apparatus cuts the sheet every designated block number (see, for example, Japanese Laid-open Patent Publication No. 2010-97008, and corresponding published application US2010/0098445).

A strip printer (continuous medium printer) is a type of an image forming apparatus that forms image blocks on an elongated continuous printing sheet that is subsequently cut into segments. The sheet is typically paper or other flexible material, perhaps with an adhesive on one side. A label printer is an example of a strip printer. The image blocks of some label printers consist of single characters such as numbers or letters. Other label printers form image blocks consisting of a plurality of characters and/or other visual depictions, such as pictures, designs, symbols, or so forth. A poster printer is another example of a strip printer. Here, the sheet is typically a continuous paper or other flexible film and the image blocks may consist of pictures/or written material or designs. The image blocks may also consist of portions of a larger image, with these portions later being fit together to form, for example, a billboard advertisement.

However, when the total number of image blocks formed on the sheet is not a multiple of a designated number of blocks that are to be printed on a segment that will subsequently be cut from the sheet, except possibly the last segment that is cut, which will hereafter be called blocks per segment, a cutting position on the sheet is different depending on whether the printing is conducted in a normal (forward) order or a reverse order. For example, consider a case in which a sheet on which five image blocks are formed is to be cut every 3 image blocks. When the printing order is the normal order, the sheet is divided into a segment corresponding to the first image block, the second image block and the third image block, and into another segment corresponding to the forth image block and the fifth image block. On the other hand, when the printing order is the reverse order, the sheet is divided into a segment corresponding to the first image block and the second image block, and into another segment corresponding to the third image block, the forth image block and the fifth image block.

Therefore, when image blocks are formed on a sheet, the user cannot obtain a desired result that is independent of the printing order.

SUMMARY OF THE INVENTION

According to an aspect of the disclosed invention, an image forming system for printing a sequence of image blocks on a continuous printing sheet based on image data, includes an information processing apparatus and an image forming apparatus. The information processing apparatus includes a printing setting unit. The printing setting unit designates first information and second information. The first information indicates whether a printing order of the image blocks is to be a normal order or a reverse order. The second information indicates how many image blocks of the sequence are to be printed on each of a plurality of segments of the printing sheet except for a last one of the segments. The image forming apparatus includes a cutting unit and a control unit. The cutting unit cuts the printing sheet. The control unit controls the cutting unit so as to separate the segments of the printing sheet. The control unit determines cutting positions on the printing sheet based on the first information and the second information.

According to another aspect of the disclosed invention, an image forming apparatus for printing a sequence of image blocks on a continuous printing sheet based on image data, includes a receiving unit, a cutting unit and a control unit. The receiving unit receives first information and second information. The first information indicates whether a printing order of the image blocks is to be a normal order or a reverse order. The second information indicates how many image blocks of the sequence are to be printed on each of a plurality of segments of the printing sheet except for a last one of the segments. The cutting unit cuts the printing sheet. The control unit controls the cutting unit so as to separate the segments of the printing sheet. The control unit determines cutting positions on the printing sheet based on the first information and the second information.

According to another aspect of the disclosed invention, an information processing apparatus for instructing image forming apparatus to print a sequence of image blocks on a continuous printing sheet based on image data, includes a printing setting unit and a outputting unit.

The printing setting unit designates first information and second information. The first information indicates whether a printing order of the image blocks is to be a normal order or a reverse order. The second information indicates how many image blocks of the sequence are to be printed on each of a plurality of segments of the printing sheet except for a last one of the segments. The outputting unit outputs the first information, the second information, and the image data.

According to this invention, when image blocks are formed on a sheet, the user can obtain a desired result regardless of the printing order.

DETAILED DESCRIPTION OF EMBODIMENTS

Hereinafter, preferred embodiments of the invention will be described with reference to the attached drawings.
1. First Embodiment
1-1. Structure FIG. 2 is a block diagram showing the configuration of an image forming system 1.

Figure 2:
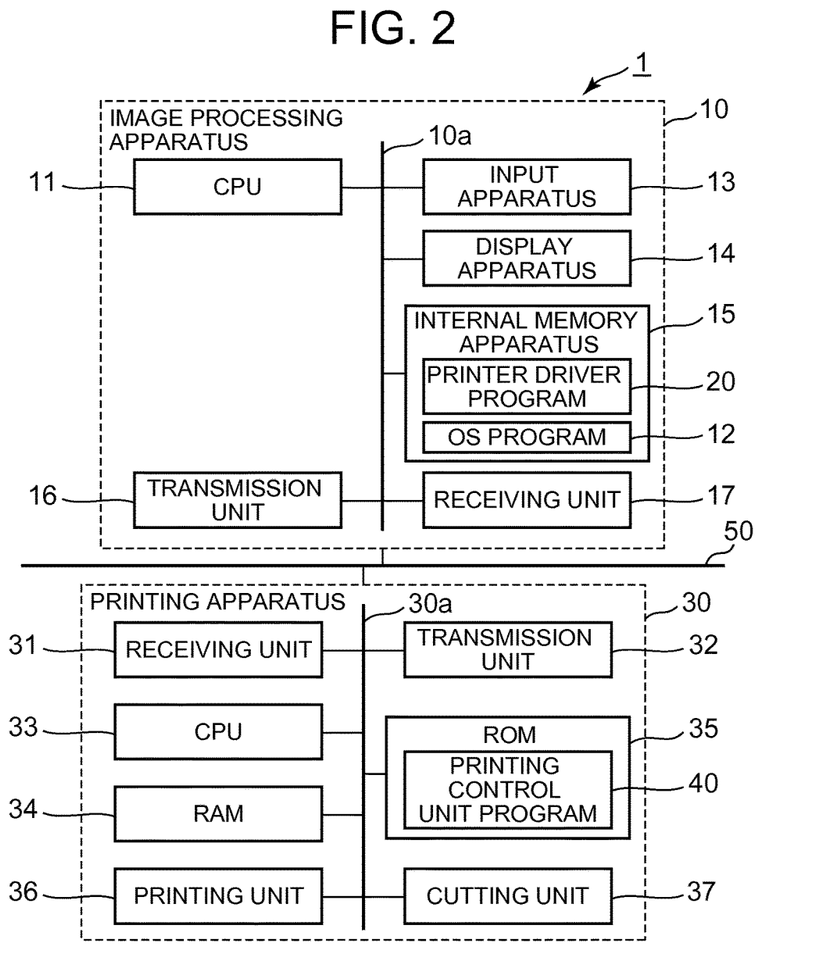
FIG. 2 is a block diagram showing the configuration of an image forming system.

As shown in FIG. 2, the image forming system 1 may include an image processing apparatus 10 and a printing apparatus 30. The image processing apparatus 10 and the printing apparatus 30 are connected to one another through a network 50 as a transmission medium. The image processing apparatus 10 performs image processing on block data. The image processing apparatus 10 outputs a printing job including image data corresponding to image blocks to the printing apparatus 30. The printing apparatus 30 forms image blocks on a continuous printing sheet based on the inputted printing job.

The image processing apparatus 10 may a Personal Computer (PC), a workstation or other information processing apparatus. The image processing apparatus 10 executes image processing for the block data, print setting processing, and so on. The image processing apparatus 10 outputs the printing job to the printing apparatus 30 through the network 50.

The image processing apparatus 10 may include a CPU 11, an input apparatus 13, a display apparatus 14, an internal memory apparatus 15, a transmission unit 16 and a receiving unit 17. The CPU 11, the input apparatus 13, the display apparatus 14, the internal memory apparatus 15, the transmission unit 16 and the receiving unit 17 communicate with one another through an internal bus 18. The CPU 11 controls the entire image forming apparatus 10. The input apparatus 13 inputs data from the outside. The display apparatus 14 displays image blocks to be printed and print setting information. The internal memory apparatus 15 may be RAM and HDD. The internal memory apparatus 15 stores a printer driver program 20 and OS program 12. The transmission unit 16 outputs the printing job. The receiving unit 17 receives communication control data.

The printing apparatus 30 receives the printing job from the image processing apparatus 10 through the network 50. The printing apparatus 30 forms (prints) image blocks on the continuous printing sheet based on the received printing job. The printing apparatus 30 outputs the continuous printing sheet on which the image blocks is formed. The printing apparatus 30 cuts the continuous printing sheet on which the image blocks is formed by cutters.

The printing apparatus 30 may include a receiving unit 31, a transmission unit 32, a CPU 33, a RAM 34, a ROM 35, a printing unit 36 and a cutting unit 37. The receiving unit 31, the transmission unit 32, the CPU 33, the RAM 34, the ROM 35, the printing unit 36, and the cutting unit 37 communicate with one another through an internal bus 38. The receiving unit 31 receives the printing job. The transmission unit 32 transmits the communication control data. The CPU 11 controls the entire printing apparatus 30. RAM 34 stores the printing job and various data temporarily. ROM 35 stores a printing control unit program 40. The printing unit 36 executes the print processing. The cutting unit 37 (i.e., the cutter 37) cuts the continuous printing sheet.

Figure 3:
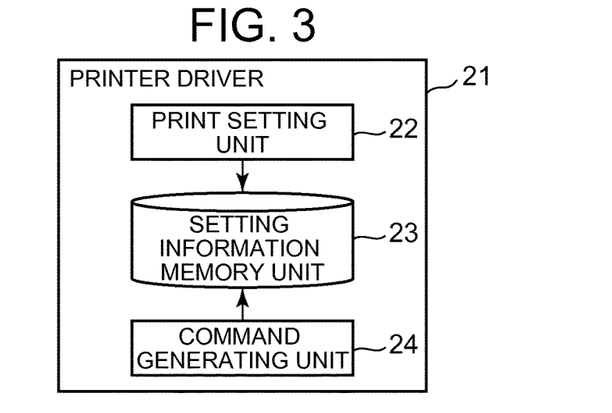
FIG. 3 is a block diagram showing the configuration of a printer driver.
Figure 4:
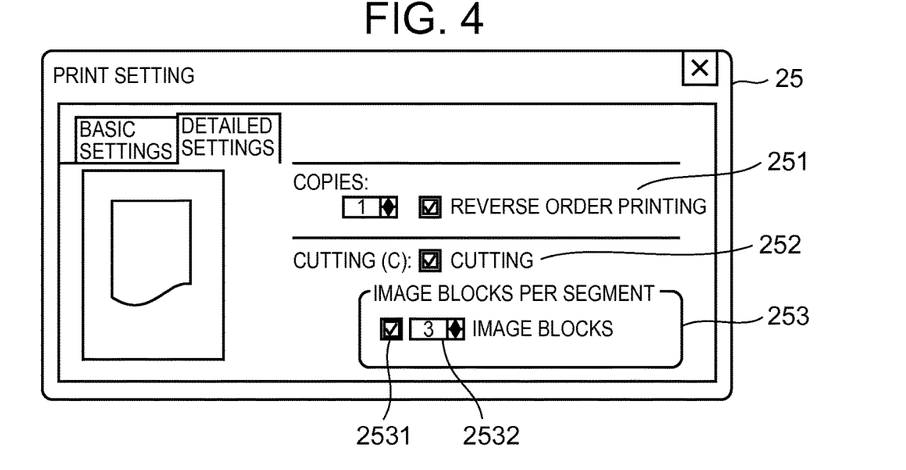
FIG. 4 is a schematic view showing a print setting screen.

FIG. 3 is a block diagram showing the configuration of the printer driver 21. FIG. 4 is a schematic view showing a print setting screen which is displayed by the display apparatus 14.

As shown in FIG. 3, the printer driver 21 includes a print setting unit 22, a setting information memory unit 23, and a command generating unit 24. The printer driver 21 is realized by the printer driver program 20, CPU 11, OS program 12, and the internal memory apparatus 15 in collaboration.

The print setting unit 22 controls the display apparatus 14 to display a print setting screen 25 as shown in FIG. 4. The print setting unit 22 executes various print settings through the print setting screen 25. Namely, the print setting unit 22 designates various items of print setting information through the print setting screen 25. The print setting information may be sheet size, sheet thickness and printing mode.

The print setting unit 22 designates printing order setting information (first information) that indicates whether the normal printing order or the reverse printing order should be used when the printing apparatus 30 forms the image blocks on the continuous printing sheet. The print setting unit 22 designates cutting block information (second information) that designates how many image blocks are to be printed on each segment that is to be cut from the continuous printing sheet.

The printing setting screen 25 as shown in FIG. 4 includes a check box 251 for designating the printing order setting information. When a check is placed in the check box 251, the printing setting unit 22 designates the normal order as the printing order setting information. When a check is not placed in the check box 251, the printing setting unit 21 designates the reverse order as the printing order setting information. The printing setting screen 25 also includes a check box 252 for specifying whether or not the cutting unit 37 is to cut the continuous printing sheet on which the image blocks are formed. The printing setting screen 25 also includes an image blocks per segment designating column 253. The image blocks per segment designating column 253 includes a check box 2531 and a number designating column 2532. When the check in the check box 2531 is placed, the cutting unit 37 cuts the continuous printing sheet every image blocks inputted in the number designating column 2532. When the check box 252 is not placed, the check box 2531 is not placed too.

The setting information memory unit 23 stores the print setting information set by the print setting unit 22.

The command generating unit 24 converts data that is outputted from application software to a command that is recognizable by the printing apparatus 30 based on the print setting information.

The command generating unit 24 generates the printing job which includes the image blocks, the command corresponding to the various items of printing setting information, the command corresponding to the printing order setting information and the command corresponding to the cutting block information. The command generating unit 24 outputs the printing job to the transmission unit 16. The transmission unit 16 transmits the printing job to the printing apparatus 30.

Figure 1:
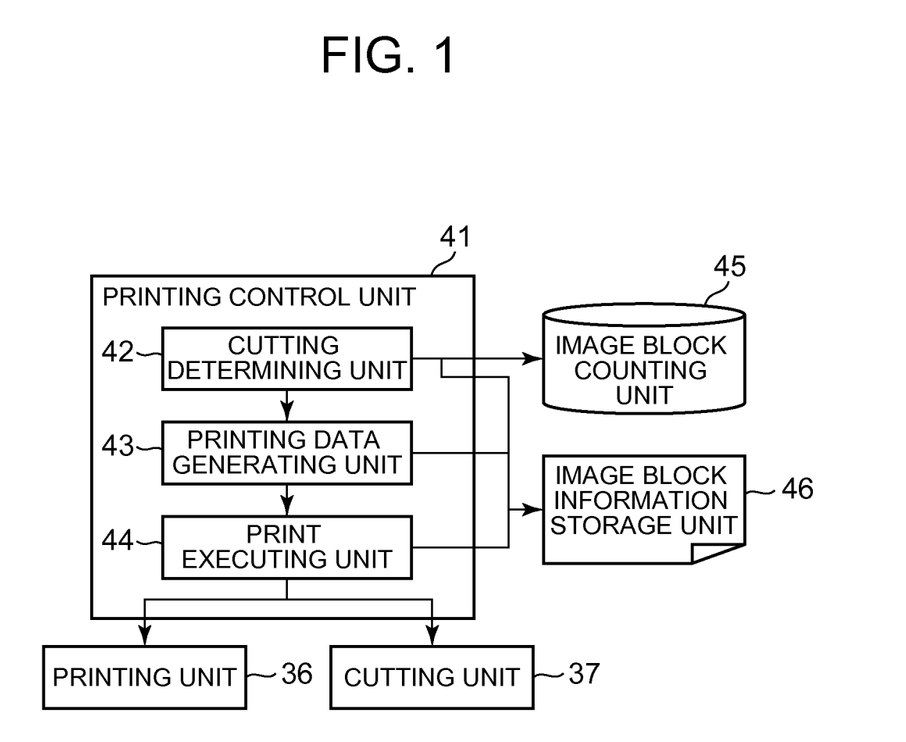
FIG. 1 is a block diagram showing the configuration of a printing control unit of a printing apparatus.

FIG. 1 is a block diagram showing the configuration of the printing control unit 41 of the printing apparatus 30. The printing control unit 41 controls print processing by analyzing the printing job. The printing control unit 41 is realized by the printing control unit program 40, the CPU 33 and the RAM 34 in collaboration.

The printing control unit 41 includes a cutting determining unit 42, a printing data generating unit 43, a print executing unit 44, an image block counting unit 45 and an image block information storage unit 46. The image block counting unit 45 and the image block information storage unit 46 are arranged to the RAM 34 of the printing apparatus 30.

The cutting determining unit 42 counts the number of image blocks based on the printing job. A counted value (an image block count value) is stored in the image block counter unit 45. The cutting determining unit 42 analyzes the inputted printing job. The cutting determining unit 42 determines whether an image block which is being analyzed is the last one in a segment that is to be cut. The cutting determining unit 42 analyzes the inputted command. The cutting determining unit 42 determines whether or not a mode is a cutting mode where the continuous printing sheet on which the image blocks are formed is cut. When the mode is the cutting mode, the cutting determining unit 42 determines whether the image block printing order is the normal order or the reverse order. The cutting determining unit 42 also determines a cutting position on the continuous printing sheet according to the determined printing order.

The image block counting unit 45 stores the image block count value counted by the cutting determining unit 42. The image block count value indicates the particular image block that the cutting determining unit 42 is currently analyzing.

The image block information storage unit 46 stores the image data corresponding to each of a sequence of image blocks analyzed by the cutting determining unit 42, as image block information frames. Specifically, a first block information frame corresponds to the first image block. A second block information frame corresponds to the second image block.

The printing data generating unit 43 generates printing data by using the image block information frames stored in the image block information storage unit 46. The printing data generating unit 43 outputs the printing data to the printing executing unit 44. Specifically, the printing data generating unit 43 generates block printing data corresponding to first image block by using the first image block frame. The printing data generating unit 43 generates block printing data corresponding to second image block by using the second image block frame. The printing data generating unit 43 outputs the printing data corresponding to first image block and the printing data the second image block to the printing executing unit 44 severally.

The print executing unit 44 receives printing instruction information from the printing data generating unit 43. The print executing unit 44 outputs the printing data to the printing unit 36 based on the printing instruction information. The print executing unit 44 controls the printing unit 36 to execute print processing. The print executing unit 44 controls the cutting unit 37 to cut the continuous printing sheet.

1-2. Processing

Figure 5:
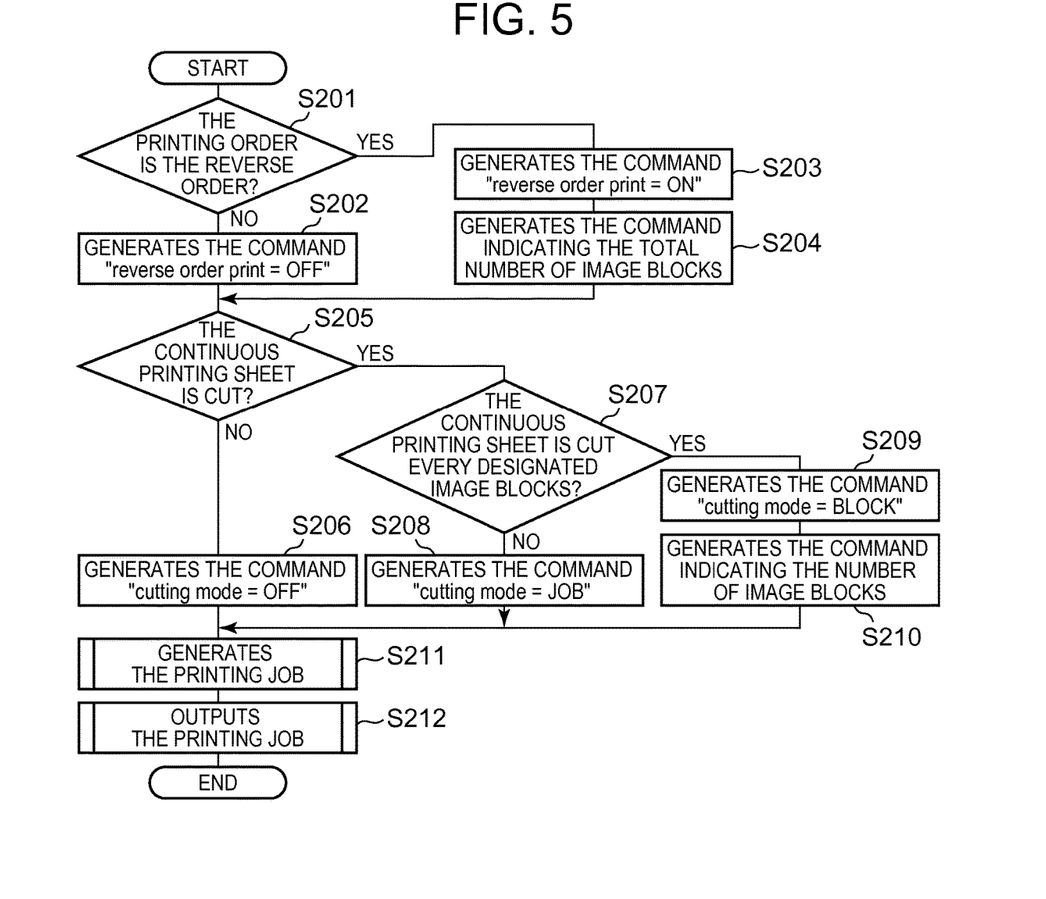
FIG. 5 is a flowchart showing processing executed by a printer driver.
Figure 6:
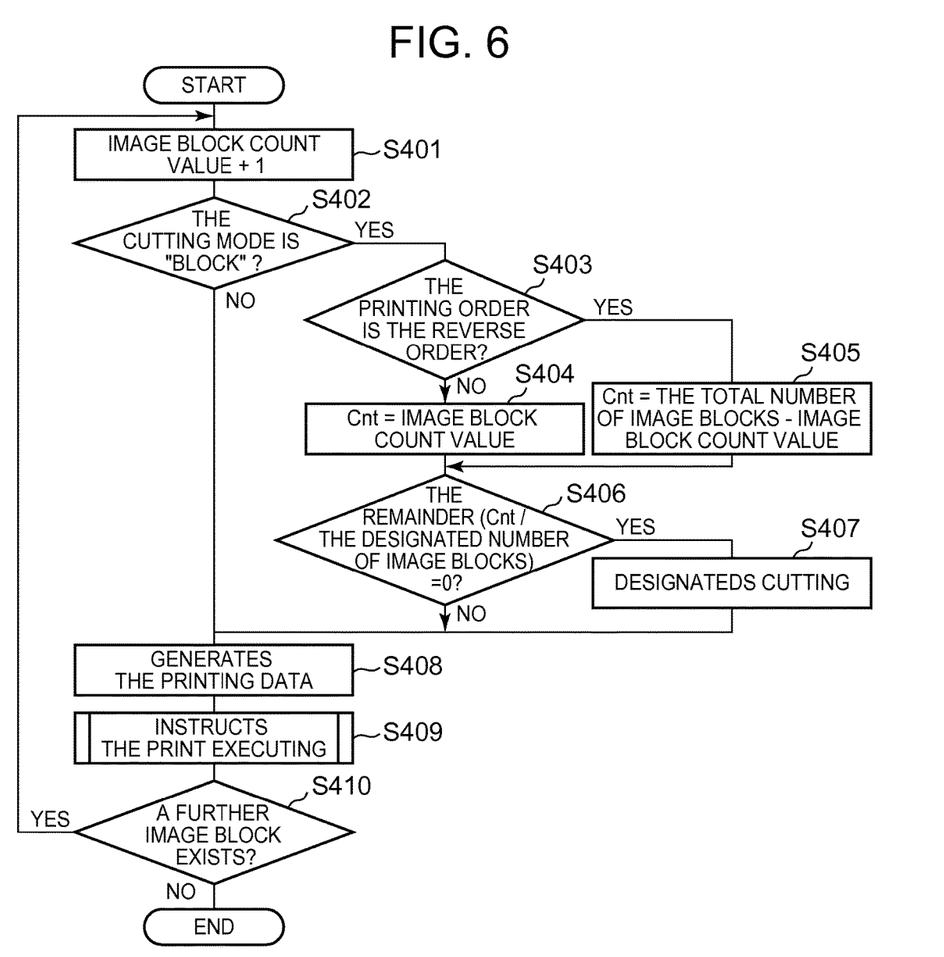
FIG. 6 is flowchart showing print control processing executed by the printing control unit of the printing apparatus.
Figure 7:
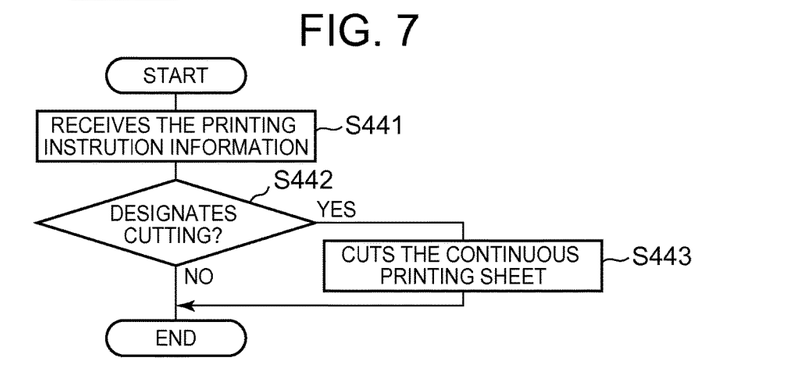
FIG. 7 is flowchart showing print control processing executed by the printing apparatus.

FIG. 5 is a flowchart showing processing executed by the printer driver 21 of the image processing apparatus 10. FIG. 6 is a flowchart showing printing control processing executed by the printing control unit 41 of the printing apparatus 30. FIG. 7 is a flowchart showing printing processing executed by the printing apparatus 30.

A user operates the image processing apparatus 10. The display apparatus 14 displays the print setting screen 25. The items of various print setting information are input by the user through the print setting screen 25. The print setting information is stored in the setting information memory unit 23. For example, a setting for the printing order, the setting for whether or not the continuous printing sheet is to be cut, and a setting for how many image blocks are to be printed on each segment that will subsequently be cut from the continuous printing sheet, are entered using the print setting screen 25.

In a first example, the check box 251 is designated. The check box 252 is designated. The check box 2531 is designated. "3" is input in the number designating column 2532.

After the various items of print setting information are input by the user through the print setting screen 25, the command generating unit 24 executes the processing shown in FIG. 5.

As shown in FIG. 5, the command generating unit 24 generates the command for print processing based on the print setting information stored in the setting information memory unit 23.

First, the command generating unit 24 determines whether or not the printing order is the reverse order based on the print setting information stored in the setting information memory unit 23 (step S201). When the print order is the normal order (step S201: NO), the command generating unit 24 generates the command "reverse order print=OFF" (step S202). Then the command generating unit 24 moves the process to step S205. On the other hand, when the print order is the reverse order (step S201: YES), the command generating unit 24 generates the command "reverse order print=ON" (step S203). Then the command generating unit 24 generates the command indicating the total number of image blocks per segment (step S204). Then the command generating unit 24 moves the process to step S205.

The command generating unit 24 determines whether or not the continuous printing sheet is cut based on the print setting information stored in the setting information memory unit 23 (step S205).

When the sheet is not cut, the command generating unit 24 generates the command "cutting mode=OFF" (step S206).

On the other hand, when the continuous printing sheet is to be cut, the command generating unit 24 determines whether or not the continuous printing sheet is to be cut every designated number of image blocks based on the print setting information stored in the setting information memory unit 23 (step S207). When the continuous printing sheet is not to be cut every designated number of image blocks (step S207: NO), the command generating unit 24 generates the command "cutting mode=JOB" (step S208). Then the command generating unit 24 moves the process to step S211. When the continuous printing sheet is cut every designated number of image blocks (step S207: YES), the command generating unit 24 generates the command "cutting mode=BLOCK" (step S209). Then the command generating unit 24 generates a command indicating the number of image blocks designated at the number designating column 2532 (step S210). In the first example, the number of image block is "3".

The command generating unit 24 converts data that is outputted from application software to data (the command) that the printing apparatus 30 can recognize. Then the command generating unit 24 generates a printing job which includes the generated commands (step S211). The command generating unit 24 outputs the printing job to the transmission unit 16 (step S212). The transmission unit 16 transmits the printing job to the printing apparatus 30.

FIG. 6 and FIG. 7 are flowcharts showing print control processing executed by the printing control unit 41, the print executing unit 44, and the cutting unit 37 of printing apparatus 30 when the receiving unit 31 of printing apparatus 30 receives the printing job.

The receiving unit 31 receives the printing job. Then the printing control unit 41 starts to analyze the printing job.

As shown FIG. 6, the cutting determining unit 42 of the printing control unit 41 increments the image block count value stored in the image block counting unit 45 by "1" (step S401). The initial value of the image block count value is "0". When the cutting determining unit 42 analyzes a first image block of the image data, the image block count value is from "0" to "1".

The cutting determining unit 42 determines whether or not the cutting mode is "BLOCK" based on the command included in the print job (step S402). When the cutting mode is not "BLOCK", namely, the cutting mode is "OFF" or "JOB" (step S402: NO), the cutting determining unit 42 moves the process to step S408.

On the other hand, when the cutting mode is "BLOCK" (step S402: YES), the cutting determining unit 42 determines whether the printing order is the reverse order based on the command corresponding to the printing order setting information (step S403).

When the printing order is not the reverse order (step S403: NO), namely, the printing order is the normal order, the cutting determining unit 42 substitutes the image block count value for a variable "Cnt" (step S404). When the printing order is the reverse order (step S403: YES), the cutting determining unit 42 substitutes a value for the differences between the total number of image blocks and the image block count value, for the variable "Cnt" (step S405).

The printing job includes a command indicating the total number of image blocks included in the printing job, generated by the printer driver 21. The cutting determining unit 42 detects the total number of image blocks based on the printing job.

The cutting determining unit 42 divides the variable "Cnt" by the number of image block designated at the number designating column 2532. The cutting determining unit 42 detects the remainder of the variable "Cnt" divided by the designated number of image blocks. The cutting determining unit 42 determines whether or not the remainder is "0" (step S406).

When the remainder is "0" (step S406: YES), the cutting determining unit 42 writes information indicating that the cutting position is between the particular image block that the cutting determining unit 42 is currently analyzing and a next image block, in the image block information storage unit 46 (step S407). Namely, the cutting determining unit 42 writes information indicating that the particular image block is the last one in a segment that is to be cut, in the image block information storage unit 46. On the other hand, when the remainder is not "0" (step S406: NO), the cutting determining unit 42 moves the process to step S408.

The printing data generating unit 43 analyzes the printing job. The printing data generating unit 43 writes information needed for printing in the image block information storage unit 46. The printing data generating unit 43 generates the printing data corresponding to an image block, based on an image block information frame stored in the image block information storage unit 46 (step S408). For example, the printing data is rasterized data. Then the printing data generating unit 43 writes the printing data in the image block information storage unit 46. The printing data generating unit 43 controls the print executing unit 44 to execute print processing (step S409). In the print processing, the printing executing unit 44 controls the printing unit 36 to form an image block on the continuous printing sheet based on the printing data. Then the printing data generating unit 43 determines whether or not a further image block exists based on the total number of image blocks and the image block count value (step S410). When the further image block exists, the print data generating unit 43 moves the process to step S401. When the further image block does not exist, the process finishes.

As shown FIG. 7, the print executing unit 44 receives the printing instruction information from the printing data generating unit 43 (step S441), the print executing unit 44 outputs the printing data generated by the printing data generating unit 43 to the printing unit 36. The printing instruction information indicates that the particular image block is formed on the continuous printing sheet. The print executing unit 44 determines whether or not information indicating that the cutting position is between the particular image block and a next image block exists, in the image block information storage unit 46 (step S442). When the information exists (step S442: YES), the print executing unit 44 outputs instruction for cutting the continuous printing sheet, to the cutting unit 37. Based on the instruction, the cutting unit 37 cuts the continuous printing sheet at the cutting position between the particular image block and the next image block (step S443). On the other hand, when the information does not exist (step S442: NO), the print executing unit 44 finishes the processing.

Figure 8A:
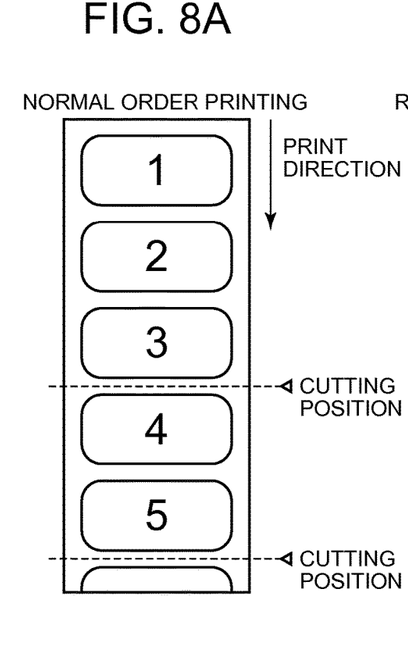
FIG. 8A is a schematic view indicating the cutting position when the print order is the normal order.

As shown FIG. 8A, when the print order is the normal order, the print processing is executed in order of the "1" image block, the "2" image block, the "3" image block, the "4" image block, and the "5" image block for a print direction. Because the number of image blocks designated at the number designating column 2532 is "3", the image block information storage unit 46 stores information indicating that the cutting position is between "3" and "4". Therefore, the cutting unit 37 cuts the continuous printing sheet at a cutting position which is between "3" and "4". The cutting unit 37 cuts the continuous printing sheet at the cutting position which is the end of the total number of image blocks, namely, the end of the "5".

Figure 8B:
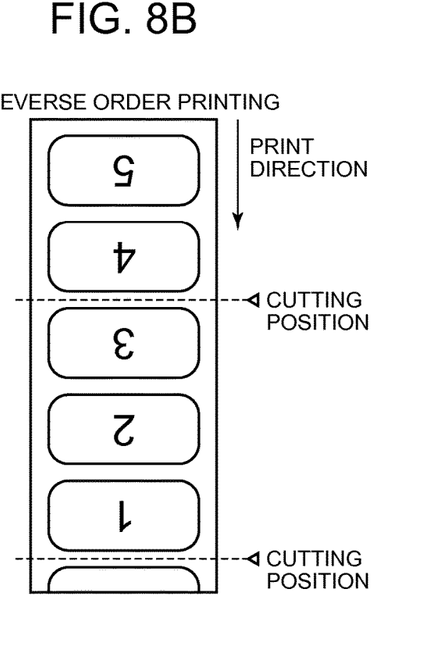
FIG. 8B is a schematic view indicating the cutting position when the print order is the reverse order.

As shown FIG. 8B, when the print order is the reverse order, the print processing is executed in order of the "5" image block, the "4" image block, the "3" image block, the "2" image block, and the "1" image block for the print direction. Because the number of image blocks designated at the number designating column 2532 is "3", the image block information storage unit 46 stores information indicating that the cutting position is between "4" and "3". Therefore, the cutting unit 37 cuts the continuous printing sheet at the cutting position which is between "4" and "3". The cutting unit 37 cuts the continuous printing sheet at the cutting position which is the end of the total number of image blocks, namely, the end of the "1".

1-3. Effect

According to the first embodiment, when image blocks are formed on a sheet, the user can obtain a desired result that is independent of the printing order. For example, the user can obtain a segment of the sheet corresponding to the image block "1", "2", "3" and a segment of the sheet corresponding to a segment "4", "5", without depending on the printing order.

According to the embodiment, it is not necessary to insert an extra blank image block.

2. Second Embodiment 2-1. Structure

Figure 14:
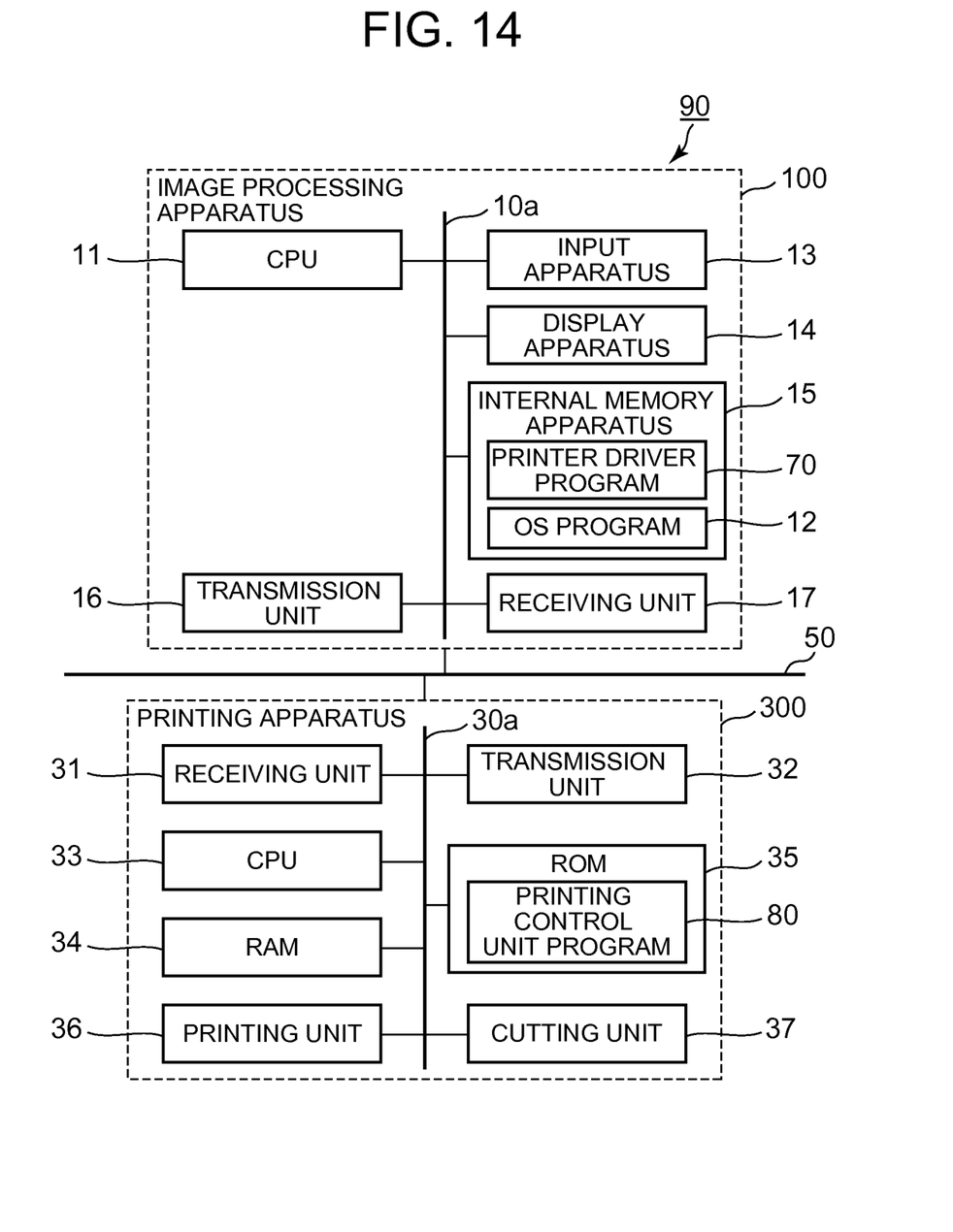
FIG. 14 is a block diagram showing the configuration of an image forming system.

FIG. 14 is a block diagram showing the configuration of an image forming system 90.

In the second embodiment, the structure of a printer driver 71 included the image processing apparatus 100 and the structure of a printing control unit 81 included the printing apparatus 300 are different from the printer driver 21 and the printing control unit 41 in the first embodiment.

FIG. 14 is a block diagram showing the configuration of an image forming system 90.

As shown in FIG. 14, the image forming system 90 may include an image processing apparatus 100 and a printing apparatus 300. The internal memory apparatus 15 stores a printer driver program 70. The ROM 35 stores a printing control unit program 80. Other structure is same as the structure in the first embodiment. Therefore the explanation is omitted.

Figure 9:
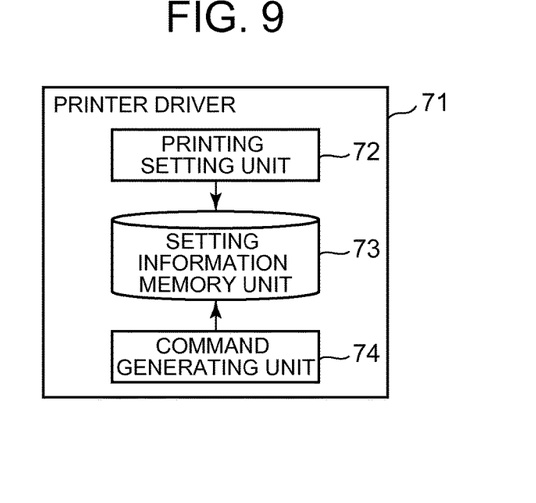
FIG. 9 is a block diagram showing the configuration of a printer driver.
Figure 10:
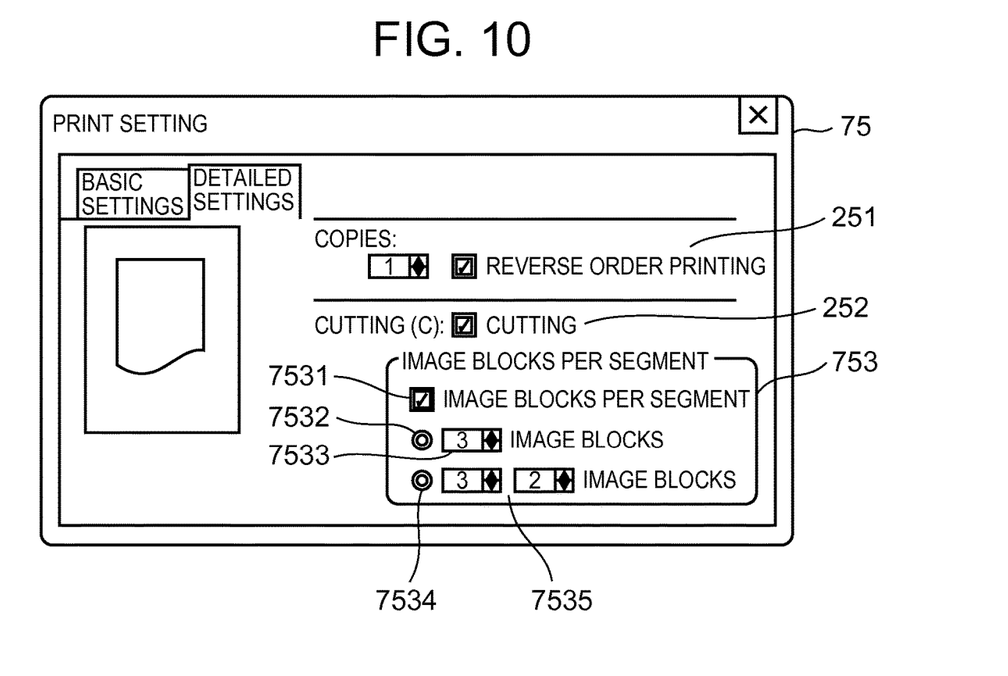
FIG. 10 is a schematic view showing a print setting screen.

FIG. 9 is a block diagram showing the configuration of the printer driver 71. FIG. 10 is a schematic view showing a print setting screen 75 which is displayed by the display apparatus 14.

As shown in FIG. 9, the printer driver 71 includes a printing setting unit 72, a setting information memory unit 73, and a command generating unit 74. The printer driver 71 is realized by the printer driver program 70, CPU 11, OS program 12, and the internal memory apparatus 15 in collaboration.

The print setting unit 72 controls the display apparatus 14 to display a print setting screen 75. The printing setting unit 72 sets a plurality of values for number of image blocks per segment through the printing setting screen 75.

As shown FIG. 10, the printing setting screen 75 includes a check box 251 and a check box 252. The print setting screen 75 includes an image blocks per segment designating column 753. The image blocks per segment designating column 753 may include a check box 7531, a radio button 7532, a number designation column 7533, a radio button 753, and a number designation column 7535.

The number designation column 7533 accepts one value for the number of image blocks per segment that is to be cut from the continuous printing sheet.

The number designation column 7535 accepts two values for the number of image blocks per segment that is to be cut from the continuous printing sheet. Namely, the number designation column 7535 accepts a first designation number and a second designation number. In this example of the second embodiment, the number designation column 7535 accepts "3" as the first designation number and "2" as the second designation number. The cutting unit 37 repeats cutting at the cutting position where "3" image blocks are finished and "2" image blocks are finished in turn.

When the check box 7531 is designated, any one of the radio button 7532 and the radio button 7534 is selected. When the radio button 7532 is selected, the processing in the first embodiment shown in FIG. 1-FIG. 8B is executed.

The setting information memory unit 73 stores a print setting information set by the print setting unit 72.

The command generating unit 74 generates a printing job which includes image data corresponding to image blocks, a command corresponding to the various items of printing setting information, a command corresponding to the printing order setting information and a command corresponding to the cutting blocks information.

Figure 11:
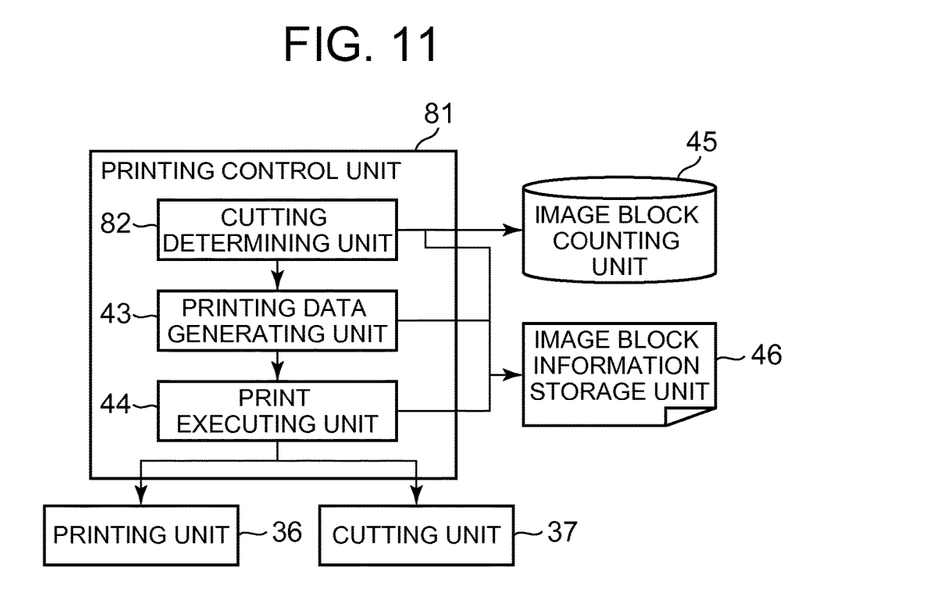
FIG. 11 is a block diagram showing the configuration of a printing control unit of a printing apparatus.

FIG. 11 is a block diagram showing the configuration of a printing control unit 81 of the printing apparatus 300. The printing control unit 81 is realized by the printing control unit program 80, a CPU 33 and a RAM 45 in collaboration. The printing control unit 81 includes a cutting determining unit 82, a printing data generating unit 43, a print executing unit 44, an image block counting unit 45 and an image block information storage unit 46.

The cutting determining unit 82 analyzes the input printing job. The cutting determining unit 82 determines whether an image block which is being analyzed is the last one in a segment that is to be cut.

2-2. Processing

Figure 12:
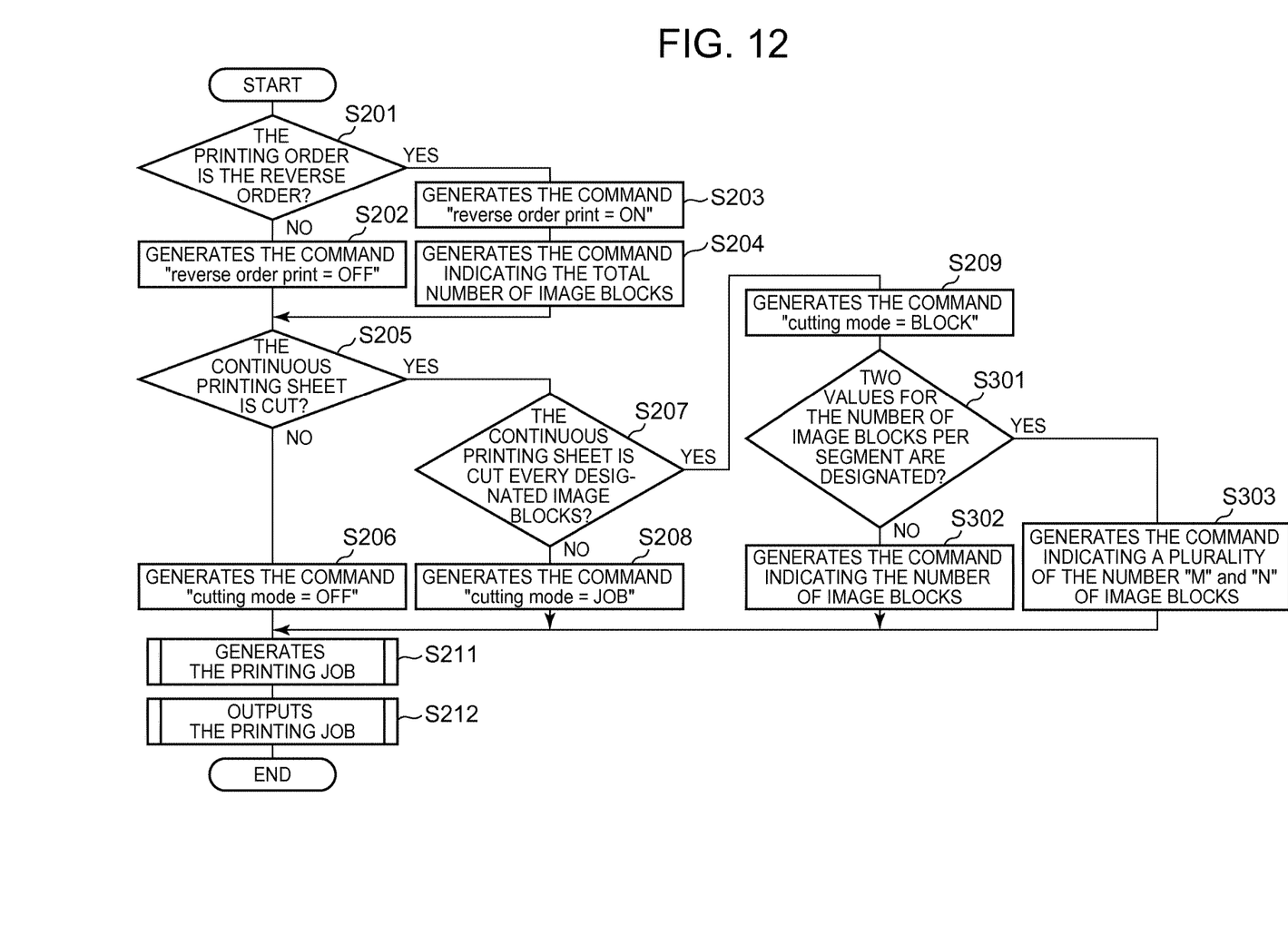
FIG. 12 is a flowchart showing processing executed by the printer driver.

FIG. 12 is a flowchart showing processing executed by the printer driver 71 of the image processing apparatus 100.

Figure 13:
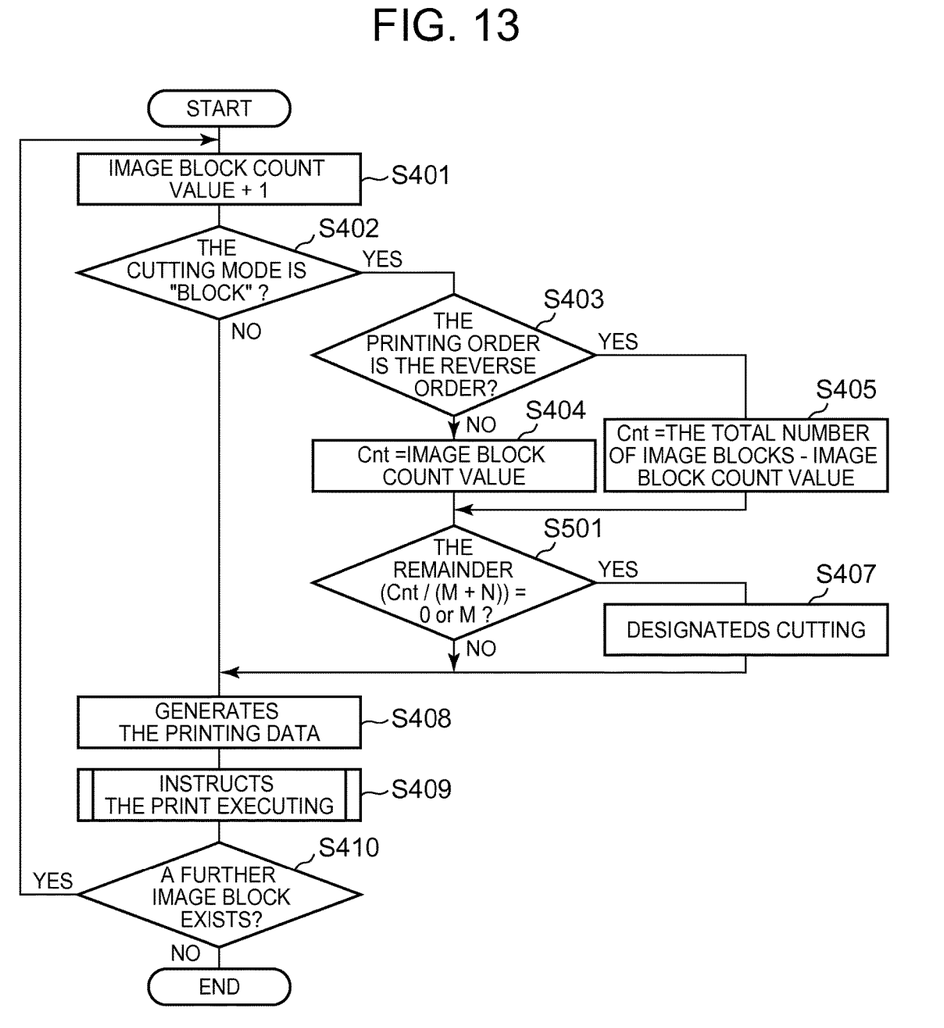
FIG. 13 is a flowchart showing print control processing executed by the printing control unit of the printing apparatus.

FIG. 13 is a flowchart showing print control processing executed by the printing control unit 81 of the printing apparatus 300.

In FIG. 12, the processes in step S201-step S209, step S211, step S212 is same as the process in FIG. 5 in the first embodiment. Therefore explanation is omitted.

When the continuous printing sheet is cut every designated number of image blocks (step S207: YES), the command generating unit 74 generates the command "cutting mode=BLOCK" (step S209). Then the command generating unit 74 determines whether or not two values for the number of image blocks per segment are designated based on the print setting information stored in the setting information memory unit 73 (step S301). When the two values are designated (step S301: YES), namely, the radio button 7534 in the print setting screen 75 is selected, the command generating unit 74 generates a command indicating the number of image blocks "M" and the number of image blocks "N" (M>N: M and N are integers) designated at the number designating column 7535 (step S303). When the two values are not designated (step S301: NO), namely, the radio button 7532 in the print setting screen 75 is selected, the command generating unit 74 generates a command indicating the number of image blocks designated at the number designation column 7533 (step S302).

In FIG. 13, the process in step S401-step S405, step S407-step S410 is same as the process in FIG. 6 in the first embodiment. Therefore the explanation is omitted.

The cutting determining unit 82 determines whether the printing order is the reverse order based on the command corresponding to the printing order setting information (step S403). When the printing order is not the reverse order (step S403: NO), the cutting determining unit 82 substitutes the image block count value for the variable "Cnt" (step S404). When the printing order is the reverse order (step S403: YES), the cutting determining unit 82 substitutes a value for the difference between the total number of image blocks and the image block count value, for the variable "Cnt" (step S405).

The cutting determining unit 82 divides the variable "Cnt" by the sum of "M" and "N". The cutting determining unit 82 detects the remainder of the variable "Cnt" after this division. The cutting determining unit 82 determines whether or not the remainder is "0" or "M" (step S501). When the remainder is "0" or "M (which is "2" as this example)" (step S501: YES), the cutting determining unit 82 writes information indicating that the cutting position is between the particular image block and the next image block, in the image block information storage unit 46 (step S407). On the other hand, when the remainder is not "0" and "M" (step S501: NO), the cutting determining unit 82 moves the process to step S408.

When the radio button 7532 in the print setting screen 75 is selected, the process in step S406 is executed instead of the process in step S501.

2-3. Effect

According to the second embodiment, when image blocks are formed on a sheet, the user can obtain a desired result that is independent of the printing order.

3. Other Embodiments

In the first embodiment, in every the print job, a designation as to whether or not the cutting unit 37 is to cut the continuous printing sheet is set. However, it is not limited to this example. For example, in every sheet setting, the designation as to whether or not the cutting unit 37 is to cut the continuous printing sheet may be set.

In the first embodiment, the printing control unit program 40 is stored in the ROM 35. However, the printing control unit program 40 may be stored in the RAM 34.

In the second embodiment, two values for the number of image blocks per segment are designated. However, a plurality of values (for example, three values) for the number of image blocks per segment may be designated.

What is claimed is:

1. An image forming system for printing a sequence of image blocks using a continuous printing sheet, comprising:
   an information processing apparatus that includes:
      a first processor; and
      a first storage medium containing first program instructions, execution of which by the first processor causes the information processing apparatus to provide functions of
         a printing setting unit configured to receive first information and second information, the first information indicating a printing order in which the sequence of image blocks is to be printed on the continuous printing sheet, the printing order corresponding to either a normal order or a reverse order of the sequence, the second information indicating a first number by which the sequence of image blocks is to be divided; and
   an image forming apparatus that includes:
      a second processor;
      a second storage medium containing second program instructions, execution of which by the second processor causes the image forming apparatus to provide functions of
         a control unit configured to determine a plurality of cutting positions on the continuous printing sheet based on the first information and the second information received from the information processing apparatus; and
      a cutter configured to cut the continuous printing sheet at the plurality of cutting positions, to thereby obtain a sequence of segments, an order of the segments in the sequence corresponding to the printing order, wherein
   each segment in the sequence has the first number of the image blocks printed thereon, except for
      a last segment when the image blocks are printed in the normal order, and
      a first segment when the image blocks are printed in the reverse order, on each of which a second number of the image blocks are printed, and
   the second number equals to the remainder of a total number of the image blocks divided by the first number if the remainder is not zero, and to the first number if the remainder is zero.

2. The image forming system according to claim 1, wherein the control unit detects the total number of the image blocks and determines the plurality of cutting positions based on the first information, the second information and the total number of the image blocks.

3. The image forming system according to claim 1, wherein
   each image block in the sequence has a number assigned by a counter, and
   for each image block when the printing order corresponds to the reverse order, the control unit
      divides a difference between the total number of the image blocks and the assigned number of said each image block by the first number, and
      when the remainder of the difference is zero, controls the cutter to cut the printing sheet at a cutting position which is between said each image block and an image block subsequent thereto.

4. The image forming system according to claim 1, wherein
   the second information includes a first setting value and a second setting value; and
   the first number is a sum of the first and second setting values.

5. An image forming apparatus for printing a sequence of image blocks using a continuous printing sheet, comprising:
   a processor; and
   a storage medium containing program instructions, execution of which by the processor causes the image forming apparatus to provide functions of
      a receiving unit configured to receive first information and second information, the first information indicating a printing order in which the sequence of image blocks is to be printed on the continuous printing sheet, the printing order corresponding to either a normal order or a reverse order of the sequence, the second information indicating a first number by which the sequence of image blocks is to be divide;
      a control unit configured to determine a plurality of cutting positions on the continuous printing sheet based on the first information and the second information; and
   a cutter configured to cut the continuous printing sheet at the plurality of cutting positions, to thereby obtain a sequence of segments, an order of the segments in the sequence corresponding to the printing order, wherein
   each segment in the sequence has the first number of the image blocks printed thereon, except for
      a last segment when the image blocks are printed in the normal order, and
      a first segment when the image blocks are printed in the reverse order, on each of which a second number of the image blocks are printed, and
   the second number equals to the remainder of a total number of the image blocks divided by the first number if the remainder is not zero, and to the first number if the remainder is zero.

6. The image forming apparatus according to claim 5, wherein the control unit detects the total number of the image blocks and determines the plurality of cutting positions based on the first information, the second information and the total number of the image blocks.

7. A method for an image forming apparatus, which prints a sequence of image blocks using a continuous printing sheet, to determine a plurality of cutting positions at which the continuous printing sheet is to be cut, the method comprising:
- receiving a printing order in which the sequence of image blocks is to be printed on the continuous printing sheet, the printing order corresponding to either a normal order or a reverse order of the sequence;
- receiving a first number by which the sequence of image blocks is to be divided;
- determining the plurality of cutting positions based on the printing order and the first number, at which the continuous printing sheet is to be cut into a sequence of segments, an order of which corresponds to the printing order, the cutting positions being so determined that
- each segment in the sequence of segments has the first number of the image blocks printed thereon, except for
    - a last segment when the image blocks are printed in the normal order, and
    - a first segment when the image blocks are printed in the reverse order, on each of which a second number of the image blocks are printed, and
- the second number equals to the remainder of a total number of the image blocks divided by the first number if the remainder is not zero, and to the first number if the remainder is zero.

\* \* \* \* \*